US006187461B1

United States Patent
Lin et al.

(10) Patent No.: US 6,187,461 B1
(45) Date of Patent: Feb. 13, 2001

(54) ELECTRODEPOSITION PROCESS OF A COBALT-CHROMIUM FILM ON ALUMINUM ALLOYS FOR MAGNETIC RECORDING

(75) Inventors: Jing-Chie Lin; Jiann-Gow Her; Shyh-Biau Jiang; Chiang-Nan Chang; Jyh-Rurng Your, all of Taoyuan Hsien (TW)

(73) Assignee: National Science Council, Taipei (TW)

( * ) Notice: Under 35 U.S.C. 154(b), the term of this patent shall be extended for 0 days.

(21) Appl. No.: 09/078,846

(22) Filed: May 14, 1998

(30) Foreign Application Priority Data

May 15, 1997 (TW) .................................. 86106478

(51) Int. Cl.$^7$ ........................................ G11B 5/66
(52) U.S. Cl. ................. 428/694 T; 428/694 ST; 428/694 SG; 428/900; 427/128; 427/129; 427/130; 205/206; 205/210; 205/213; 205/255
(58) Field of Search ............... 428/694 T, 694 ST, 428/694 SG, 900; 427/128–130; 205/255, 206, 210, 213

(56) References Cited

U.S. PATENT DOCUMENTS

| | | | |
|---|---|---|---|
| 4,075,672 | 2/1978 | Manly | 360/135 |
| 4,109,287 | * 8/1978 | Kawai | 360/131 |
| 4,210,946 | * 7/1980 | Iwasaki | 360/131 |
| 4,388,367 | 6/1983 | Chen et al. | 428/323 |

OTHER PUBLICATIONS

Czako–Nagy, M.K. El–Sharif, A. Vertes, and C.U. Chisholm; "Studies of Electrodeposied Chromium—Cobalt Alloy Coatins by Emmission Co—57 Mossbauer Spectroscopy", *Electrochimica Acta*; 1994; vol. 39, No. 6, pp. 801–805.

R.G. King; "Surface Treatment and Finishing of Aluminum"; *Pergamon Press*; 1988; p. 39.

C.U. Chisholm and M.R. El–Sharif; "Deposition of Chromium—Nickel Alloys from Dimethylformide/Water Electrolytes"; *Plating and Surface Finishing*; Aug. 1985; p. 58–61.

M. Matsuoka, R. Kammel and U. Landau; "Electrodeposition of Iron—Chromium—Nickel Alloy"; *Planting and Surface Finishing*; Oct. 1987; p. 56–60.

Harini Dasarathy, Clyde Riley, and H. Dwain Coble; "Electrodeposition of Cobalt—Chromium Alloy from Trivalent Chromium Solutions"; *J. Electrochem. Soc.*; Jul. 1994; vol. 141, No. 7, pp. 1773–1779.

* cited by examiner

Primary Examiner—Leszek Kiliman
(74) Attorney, Agent, or Firm—Merchant & Gould P.C.

(57) ABSTRACT

A cobalt-chromium (Co-Cr) magnetic film electrodeposited on the surface of an aluminum alloy. A process for making an aluminum alloy electrodeposited a cobalt-chromium (Co-Cr) magnetic film comprises the steps of chemically polishing an aluminum alloy substrate, pretreating either with phosphate or with zincate and electrodepositing in a plating bath containing cobalt and chromium ions to prepare the cobalt-chromium thin film on the aluminum alloy. Chromium content in the film can be designed by adjusting the parameters of pretreatment and electroplating. The produced cobalt-chromium film can flexibly adjust the magnetic characteristics (e.g. coercive force (Hc) and ramanence magnetization (Mr)) and is suitable for use in a magnetic recorder. The chemical composition, adhesion, microhardness, magnetic properties of the deposits indicate that the Co-Cr films produced are satisfactory for magnetic recording service.

16 Claims, 3 Drawing Sheets

ELECTRODEPOSITION PROCESS OF A COBALT-CHROMIUM FILM ON ALUMINUM ALLOYS FOR MAGNETIC RECORDING

BACKGROUND OF THE INVENTION

1. Field of the Invention

The present invention relates to the technology of electrodepositing a cobalt-chromium film on aluminum alloys, in particular to a process for making a cobalt-chromium magnetic recording film useful in a magnetic recorder by the use of the pretreatment of aluminum alloys either with phosphate or with zincate prior to the electrodepositing.

2. Description of the Prior Art

A magnetic recorder may be used as a precision sensor for controlling and measuring position, speed, and angle. Recently, with the need of a precisely automatic controller of the servomotor, the magnetic recorder appears to be important. For designing a recorder of a magnetic resistance element, there is in need of a hard magnetic drum, and after being magnetized, the magnetic field produced by the magnetic drum is sensed by a MR sensor and is useful to control motors and precision instruments, etc. While making a magnetic drum, it is desired that, after being magnetized, the magnetic resistance sensor can produce a larger voltage swing and clearer signals. In addition, it is further desirable that the deposited film possesses a fair amount of hardness and adherence in respect to the ambient environment where the magnetic recorder is located.

The processes for making a magnetic recording film can be categorized into three groups as follows:

(1) Coating magnetic powders to form a magnetic film: U.S. Pat. No. 4,075,672, for example, discloses a disk of magnetic recording element and a process of producing it by coating technology, by which process magnetic composition powders are coated onto the surface of a substrate. Although the process is convenient, there are shortcomings, such as insufficient delicacy and the lack of vertical anisotropy in the magnetic film.

(2) Depositing a cobalt-chromium alloy on a nonmagnetic material by sputtering: U.S. Pat. No. 4,210,946, for example, discloses a magnetic recording medium suitable for use in the vertical recording of signals, which process comprises sputtering a layer of material with low magnetic force and a layer of cobalt-chromium alloy onto a substrate. The advantage of the process is to utilize the content ratios of cobalt-chromium in the deposited film so as to adjust the magnetic characteristics and to increase the magnetization in the vertical direction. The cost of this process is very high because the process requires the use of expensive equipment and needs to operate in vacuum.

(3) Acquiring a magnetic film by use of electrodepositing: U.S. Pat. No. 4,109,287, for example, discloses that commercially pure aluminum (1000 series), 3000 and 5000 series aluminum alloys were opening-activated by an anodic treatment, followed by electrodepositing magnetic films of ferric, cobalt, nickel. The process, however, cannot electrodeposit a cobalt-chromium film having a chromium content of between 1 and 10% by weight and cannot adjust the magnetic characteristics (e.g. coercive force (Hc) and ramanence magnetization (Mr)) by controlling the content ratios of cobalt-chromium as of U.S. Pat. No. 4,210,946. Furthermore, U.S. Pat. No. 4,388,367 discloses activating the surface of a non-conductor such as glass as a substrate by the use of electroless copper plating and electroless nickel-phosphorus plating, followed by electrodepositing to give a cobalt-based magnetic film. Similarly, the process did not involve the surface treatment of aluminum alloys and control different content ratios of cobalt-chromium to electrodeposit the cobalt-chromium magnetic film. In both processes of patents cited hereinabove, although exhibiting the advantages of producing a magnetic film by electrodepositing, they are incapable of changing the cobalt-chromium concentration to adjust the magnetism of the deposited film, making said processes undesirable so that cobalt-chromium magnetic films are generally produced by vacuum sputtering.

Although it has been investigated that a cobalt-chromium alloy film was electrodeposited on copper sheet, based on the reference of Czako-Nagy, M. K. El-Sharif, A. Vertes, C. U. Chisholm, Electrochimica Acta, Vol. 39 No. 6, p 801–805, 1994, the applications of electrodepositing cobalt-chromium films on copper are considerably limited due to the poor mechanical properties and processability of a copper substrate. If the cobalt-chromium were electrodeposited on aluminum alloys, it would be useful because of superior machinability and low density of aluminum alloys.

In order to solve the problems mentioned above, the present invention performs a series of tests of electrodepositing a cobalt-chromium (Co-Cr) magnetic film onto aluminum alloys. Because of aluminum alloys having good mechanical properties and excellent mechanical processability, it was chemically polished and then pretreated either in phosphate or in zincate, and electrodeposited in a plating bath containing chromium and cobalt ions so as to prepare a Co-Cr thin film having different chromium contents of the cobalt-chromium film. After being magnetized, the Co-Cr film can be provided with an excellent function of magnetic recording. Therefore, the process of the present invention can electrodeposit the Co-Cr thin film onto aluminum alloys and produce a cobalt-chromium magnetic recording film, particularly with flexibly adjustable magnetic characteristics, so that the produced Co-Cr film is useful to the magnetic recorder in view of clear signals in a magnetic resistance sensor.

SUMMARY OF THE INVENTION

An object of the invention is to provide a cobalt-chromium magnetic film electrodeposited on an aluminum alloy, which has an excellent magnetic recording function after being magnetized and the magnetic characteristics of the cobalt-chromium magnetic film may be flexibly adjusted by the ratios of cobalt-chromium.

Another object of the invention is to provide an aluminum alloy electrodeposited a cobalt-chromium magnetic film, the aluminum alloy substrate of which possesses excellent mechanical properties and processability such that it is useful as a magnetic recording material.

A further object of the invention is to provide a process of electrodepositing a cobalt-chromium magnetic recording film on an aluminum alloy, wherein the aluminum alloy substrate is pretreated either in phosphate or in zincate to cause the formation of pinholes and direct-current electrodeposited in a plating bath of cobalt-chromium to increase the magnetization of vertical anisotropy of the cobalt-chromium magnetic film.

A further another object of the invention is to provide a process of electrodepositing a cobalt-chromium magnetic recording film on an aluminum alloy which uses different ratios of cobalt-chromium in the plating bath containing cobalt and chromium ions such that it can adjust the magnetic characteristics of the produced cobalt-chromium alloy magnetic film.

A yet further object of the invention is to provide a process of electrodepositing a cobalt-chromium magnetic recording film on an aluminum alloy, wherein the adherence and hardness of the resulting magnetic cobalt -chromium film are good and the magnetization thereof sensed in the magnetic resistance is excellent to produce clear sensed signals.

A yet another object of the invention is to provide an aluminum alloy electrodeposited a cobalt-chromium magnetic recording film with an excellent magnetic recording function, the aluminum alloy being pretreated either in phosphate or in zincate, and electrodeposited in a plating bath of cobalt-chromium to form the Co-Cr magnetic film with different concentrations of cobalt-chromium.

BRIEF DESCRIPTION OF THE DRAWINGS

The invention will be further described by the following drawings wherein.

DETAILED DESCRIPTION OF THE INVENTION

Figure 1:
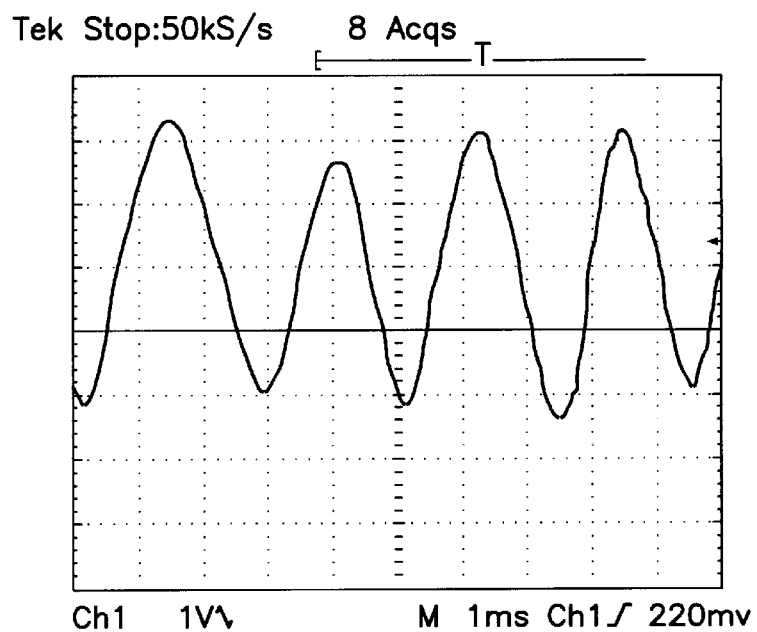
FIG. 1 shows the read out voltage of the cobalt-chromium film deposited on the 6061 aluminum alloy pretreated with a phosphate and electrodeposited at an electroplating current density of 36.8 mA/cm$^2$ according to the invention.

The present invention relates to a novel technology of electrodepositing a cobalt-chromium (Co-Cr) magnetic thin film having different ratios of cobalt-chromium on aluminum alloys and a process of manufacturing the Co-Cr film electrodeposited on aluminum alloys. The Co-Cr thin film can flexibly adjust the magnetic characteristics and is suitable to be used in the production of magnetic recorder. The present invention provides an aluminum alloy electrodeposited a cobalt-chromium magnetic recording film thereon and a process of making the same. In the aluminum alloy electrodeposited a cobalt-chromium magnetic film provided by the process of the present invention, the cobalt-chromium magnetic film has a chromium content of between 4–12% by weight for a higher hardness and adherence; alternatively, the cobalt-chromium magnetic film has the chromium content of between 0.8–1.6% by weight, in this case, the hardness and adherence thereof are still good but somewhat poorer than those of the former. Since the magnitude of the magnetism of the cobalt-chromium magnetic film can be flexibly adjusted according to cobalt-chromium ratios of the magnetic film, the cobalt-chromium magnetic film electrodeposited on the aluminum alloy is magnetized and the voltage swing sensed from a magnetic resistance sensor is significant. The output signal from the cobalt-chromium magnetic film electrodeposited on the aluminum alloy of the present invention is clear so as to largely enhance the magnetic recording function. Furthermore, the aluminum alloys electrodeposited the Co-Cr film of the invention possesses good machinability rendering it to be an excellent magnetic recording material.

Therefore, in accordance with the present invention, an aluminum alloy electrodeposited a cobalt-chromium magnetic recording film comprising an aluminum alloy as a substrate, and a cobalt-chromium magnetic recording film having a chromium content of between 4–12 wt % or of between 0.8–1.6 wt % is provided, wherein magnetic characteristics of the cobalt-chromium magnetic recording film is flexibly adjusted according to cobalt-chromium ratios of the magnetic film.

The present invention also provides a process of making an aluminum alloy electrodeposited a cobalt-chromium magnetic recording film comprising:

(a) chemically polishing an aluminum alloy and then pretreating the aluminum alloy either with a phosphate or with a zincate; and (b) electrodepositing the aluminum alloy in a plating bath containing cobalt and chromium ions by direct current to prepare a cobalt-chromium magnetic recording film on the aluminum alloy, wherein the cobalt-chromium magnetic film pretreated with a phosphate has a chromium content of between 4–12 wt %; while the cobalt-chromium magnetic film preheated with a zincate has a chromium content of between 0.8–1.6 wt %.

The aluminum alloy substrate used in the process according to the invention is selected from the group consisting of commercially available pure aluminum (1000 series), 2000 series aluminum alloys, 6000 series aluminum alloys and 7000 series aluminum alloys. The commercial pure aluminum represents the purity of aluminum is over 99%. 2000 series aluminum alloys are Al-Cu based alloys and the chemical composition of the most representative example of 2025 is Cu (3.9–5.0 wt %), Si (0.5–1.2 wt %), Fe (<0.1 wt %), Mn (0.4–1.2 wt %), Mg (<0.05 wt %), Cr (<0.1 wt %) and Zn (<0.25 wt %). 6000 series aluminum alloys are Al-Mg-Si based alloys and the chemical composition of the most representative example of 6061 is Mg (0.8–1.2 wt %), Si (0.4–0.8 wt %), Fe (<0.7 wt %), Cu (0.15–0.4 wt %), Mn (<0.15 wt %) and Cr (0.04–0.35 wt %). 7000 series aluminum alloys are Al-Zn-Mg based alloys and the chemical composition of the most representative example of 7075 is Zn (5.1–6.1 wt %), Mg (2.1–2.9 wt %), Si (<0.4 wt %), Fe (<0.5 wt %), Cu (1.2–2.0 wt %), Mn (<0.3 wt %) and Cr (0.18–0.35 wt %). Among the aluminum alloys, the 6000 series possess excellent machinability but are not easy to be electrodeposited, referring to the reference of R. G. King, "Surface Treatment and Finishing of Aluminum," Pergamon Press, Headlington Hill Hall, Oxford, England, 1988, p 39, which is incorporated herein for reference. The aluminum alloys are widely used as mechanical elements due to the light-weight, high specific strength and good processability.

Furthermore, chromium alloys, such as CrFe, CrCo and CrNi, are excellent in the corrosion resistance, abrasion resistance, hardness and strength, referring to the article of C. U. Chisholm, M. R. El-Sharif, Plating and Surface Finishing, August 1985, p 58–61, and M. Matsuoka, R. Kammel, U, Landau, Plating and Surface Finishing, October 1987, p 56–60, which are also incorporated herein for reference.

The aluminum alloy is optionally treated by grinding; namely, it is ground by #600, #800, #1000 or #1200 to ensure its levelness, before chemically polishing and pretreatment of step (a) in the process of the invention. In other words, after grinding, the debris and stains on the surface of aluminum alloys were eliminated by chemical polishing to ensure that the surface was smoothed and in turn, to facilitate the smoothness of the finished electrodeposited product. The chemical polishing may be achieved in a solution of about 9.6 M $H_3PO_4$, 2.46M $CH_3COOH$ and 0.78M $HNO_3$, at a temperature of 100° C. for 1 minute.

The purpose of the pretreatment in a phosphate, after the chemical polishing of step (a) in the process according to the invention, lies in destroying the surface layer of aluminum oxide, forming pinholes on the surface of the aluminum alloys to advantageously implant metal ions for plating, and increasing the vertically anisotropic magnetism. The pretreatment have been attempted to be conducted with sulfuric acid, oxalic acid, etc., but the resulting effects were disappointing. As a result, whether the electrodepositing is successful depends on phosphate pretreatment. In another aspect, the purpose of the pretreatment in a zincate of the invention lies in forming a conductive zinc film on the aluminum oxide layer of the aluminum alloy surface, and facilitating the effect of electrodepositing. Accordingly, if the phosphate pretreatment or zincate-dipping pretreatment was not carried out beforehand, the present invent would not be capable of producing a good cobalt-chromium electrodeposited film on aluminum alloys.

The conditions of pretreating and electrodepositing in the invention are determined in accordance with the Hull cell electrodepositing test bath. The results of the Hull cell cathode specimens given by different conditions are evaluated to determine the useful ranges thereof.

The Hull cell electrodepositing test bath is an electrodepositing test bath of electroplating liquor designed by Dr. R. O. Hull, U.S.A., in 1935. The concepts are, with un-parallel positioning of the anodic surface and cathodic surface, the current density of cathodic zone relatively near from the anode is larger than that of cathodic zone from the anode relatively far so as to give a plating concurrently but with different current densities. The specimen might have the phenomena of pits, scorching, oversized grain, poor adherence, etc. in an exceedingly high current density zone; while having the phenomena of deficient covering film, inferior gloss, etc. in an exceedingly low current density zone. As such, the optimal current density during the practical electrodepositing can be chosen from the Hull cell test which is incorporated herein for reference.

The phosphate pretreatment of the invention is conducted, for instance, in a 2–5M phosphoric acid solution by using a carbon plate as a cathode and an aluminum alloy as an anode at a temperature of 25–45° C. and applying an anodic voltage of 10–30 volts for 5–20 minutes. Preferably the anodic treatment temperature is about 35–40° C., most preferably about 38° C.; preferably the voltage of the anode is about 17–23V, most preferably about 20V; preferably the concentration of phosphoric acid is about 4–4.5M, most preferably about 4.3M; and preferably the time of electrifying treatment of the anode is about 8–15 minutes, most preferably about 10 minutes.

The zincate-dipping pretreatment is effected by dipping an aluminum alloy in a 10–15M NaOH solution and 0.5–3M ZnO solution at a temperature of 20–30° C. for 0.5–1.5 minutes. The preferred and most preferred dipping temperatures are about 22–28° C. and about 25° C., respectively, the preferred and most preferred concentrations of NaOH solution are about 12–14M and about 13M, respectively, and the preferred and most preferred concentrations of ZnO solution are about 0.5–1.5M and about 1M, respectively. Preferably the dipping time is about 0.8–1.2 minutes, most preferably about 1 minute.

The aluminum alloy pretreated by the invention is placed into a plating bath containing cobalt and chromium ions for direct current electrochemical deposition to prepare a cobalt-chromium (Co-Cr) thin film. The Co-Cr film, after being magnetized, possesses the magnetic characteristics. The composition of plating bath for cobalt-chromium electrodepositing is 0.01–0.10M $CoCl_2 \cdot 6H_2O$, 0.2–1.0M $CrCl_3 \cdot 6H_2O$, 0.2–1.0M $NH_4Cl$, 0.2–0.7M $NaCl$, 0.10–0.30M $H_3BO_3$, 0.68–2.05M N,N-dimethylformamide and 50–150 grams deionized water. Preferably the composition of plating bath for cobalt-chromium electrodepositing comprises about 1.37M $CoCl_2 \cdot 6H_2O$, about 0.8M $CrCl_3 \cdot 6H_2$), about 0.5M $NH_4Cl$, about 0.5M NaCl, about 0.15M $H_3BO_3$, about 150 grams N,N-dimethylformamide and about 100 grams deionized water. The cobalt-chromium film has the advantage of adjustable magnetism by changing the cobalt-chromium ratios in the plating bath. After being magnetized, both of the coercive force (Hc) and ramenence magnetization (Mr) in the vertical direction of the Co-Cr film in accordance with the invention are stronger than those of the conventional, and the Co-Cr film is suitable for high density magnetization such that it really benefits the designing of a magnetic recorder (such as magnetic resistance element) or coder and is much of commercial value.

After either the phosphate pretreatment or zincate-dipping pretreatment in the process according to the present invention, the aluminum alloy is electrodeposited in a cobalt-chromium plating bath at room temperature, wherein the current density of electrodepositing is measured by the Hull cell electrodepositing test bath, the hardness of the Co-Cr film by a Vickers microhardness tester, and the magnetism in the horizontal and vertical directions of the film is tested by SQUID (Superconducting Quantum Interference Device Magnetometer, Quantam Design, MPMS5) giving the data of vertical coercive force (Hc⊥), horizontal coercive force (Hc ∥), vertical ramenence magnetization (Mr⊥), and horizontal ramenence magnetization (Mr∥). From the current density of electrodepositing and the results of the chromium content (wt %), hardness (VHN), Hc ⊥ and Hc ∥), Mr⊥ and Mr∥ in the cobalt-chromium thin film, it is found that the properties such as hardness, coercive force and ramenence magnetization of the film change as the current density within the range of 36.8–92.1 $mA/cm^2$. The hardness of the film is increased with the increase of current density while the coercive force (Hc) is decreased. Moreover, the ramenence magnetization (Mr) is changed with the current density so that the optimal conditions for obtaining the cobalt-chromium film properties desired can be chosen from the relationship therebetween.

The adherence of the resulting cobalt-chromium film according to the invention is analyzed by ASTM D 3359. It is found that the Co-Cr film obtained by phosphate pretreatment and direct-current electrodeposition is of the zero order and has the best adherence; while the Co-Cr film obtained by zincate-dipping pretreatment and direct-current electrodeposition is of the second order and also has a fairly good adherence. Therefore, a cobalt-chromium magnetic film with good hardness and adherence can be produced according to the invention.

The surface of the aluminum alloy, such as commercially pure aluminum, 2000 series, 6000 series, 7000 series and the like, treated by the process of the invention and abovementioned conditions, will obtain a cobalt-chromium magnetic recording film with an excellent recording function. Particularly, the magnetism and cobalt-chromium content of the cobalt-chromium film can be adjusted by the parameters of pretreatment and electoplating. The cobalt-chromium film obtained in the process of the invention is tested by a magnetic resistance element after being magnetized. The testing method is carried out by a magnetic element available from Panasonic and this is the basis of performance test of a magnetic drum. The performance of the magnetic drum is primarily as two major characters: the pole numbers of recording media and the strength of signals after being magnetized. Thus, after the electrodeposited magnetic medium (and magnetic drum) is magnetized to 600 poles and then the magnetic poles are placed on a servomotor, the magnetic signals are read by a magnetic resistance element (magnetic sensor element) at a fixed rotating speed. Finally, the performance of the magnetic recording medium (i.e. magnetic drum) is analyzed on the basis of the signals read out from the magnetic resistance element.

After testing with the above magnetic resistance element, it is noted that the voltage swing sensed by the cobalt-chromium magnetic film electrodeposited on the aluminum alloy is significantly larger than that of commercial products, the output signals are clear and the function of magnetic recording is largely enhanced. The Co-Cr film on aluminum alloys of the present invention is an excellent magnetic recording film.

The following examples are offered by way of illustration. The examples are not intended to limit the scope of the invention in any respect and should not be so construed.

EXAMPLES

Example 1

The invention was demonstrated by using the most difficulty electrodeposited 6061 aluminum alloy as the substrate to be treated. The chemically polished 6061 aluminum alloy was pretreated in about 4M solution of phosphoric acid, with a carbon plate as the cathode and the 6061 aliminum alloy as the anode, at a temperature of about 40° C. and an anodic voltage of 20 volts, and electrified via the anode for about 10 minutes. After the pretreatment, the 6061 aliminum alloy was placed into plating bath containing cobalt and chromium ions and electrodeposited with a 36.8 mA/cm$^2$ current density. The composition of the plating bath contained about 0.05M $CoCl_2 \cdot 6H_2O$, about 0.8M $CrCl_3 \cdot 6H_2O$, about 0.5M $NH_4Cl$, about 0.5M NaCl, about 0.15M $H_3BO_3$, about 1.37M N,N-dimethylformamide and about 100 grams deionized water. The chromium content of the cobalt-chromium film resulting from the direct current electrodepositing at room temperature was 4.98 wt %. The hardness, vertical coercive force (Hc $\perp$) and horizontal coercive force (Hc $\parallel$), vertical ramenence magnetization (Mr$\perp$) and horizontal ramenence magnetization (Mr$\parallel$) were listed in Table 1, respectively.

Figure 2:
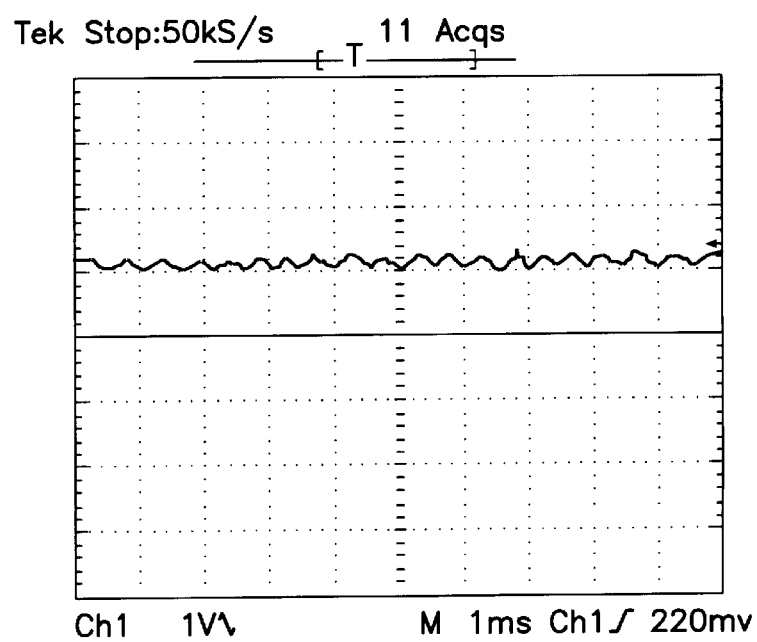
FIG. 2 shows the read out voltage of a commercial magnetic drum.

After the resulting Co-Cr film being magnetized, the voltage swing induced by a magnetic resistance sensor was about 2 volts, as illustrated in FIG. 1. The read out voltage swing was significantly larger than the voltage swing, 0.1 volt of a commercial magnetic drum, as illustrated in FIG. 2. Therefore, the obtained Co-Cr film on the 6061 aluminum allay has an excellent performance of magnetic drum.

In FIG. 1, each of the dotted squares in the ordinate with respect to channel 1 represents 1 volt (V), to channel 2 represents 2 volts, while each of the dotted squares in the abscissa with respect to channel 1 or 2 represents 1 millisecond (ms). The coordinate units of FIGS. 1, 2 and 3 to 6 are all the same.

Example 2

The steps of example 1 were repeated except that after being chemically polished and pretreated in phosphoric acid, the aluminum alloy was electrodeposited with a current density of 55.2 mA/cm$^2$ in a cobalt-chromium plating bath. The chromium content of the resulting cobalt-chromium film was 7.72 wt %. The hardness, vertical coercive force (Hc $\perp$) and horizontal coercive force (Hc $\parallel$), vertical ramenence magnetization (Mr$\perp$) and horizontal ramenence magnetization (Mr$\parallel$) were also listed in Table 1, respectively.

Figure 3:
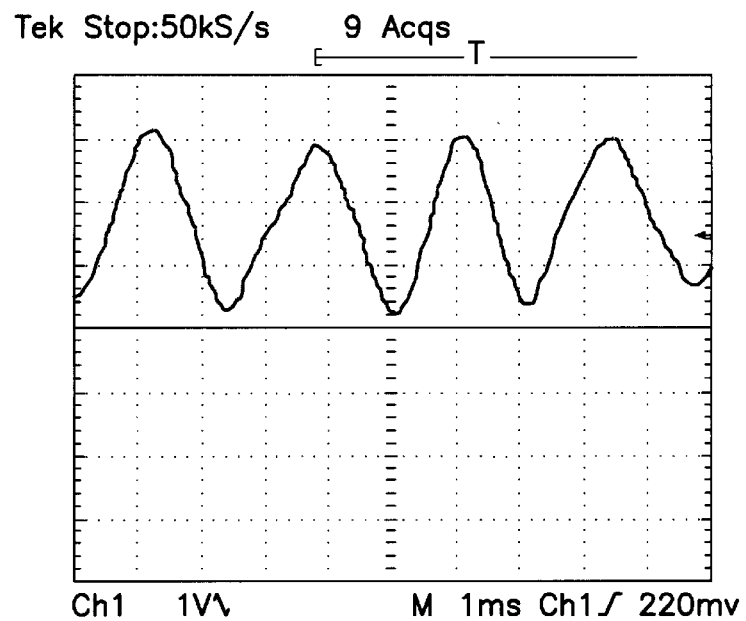
FIG. 3 shows the read out voltage of the cobalt-chromium film deposited on the 6061 aluminum alloy pretreated with a phosphate and electrodeposited at an electroplating current density of 55.2 mA/cm$^2$ according to the invention.

After the resulting Co-Cr film being magnetized, the voltage swing induced by a magnetic resistance sensor was about 1.4 volts, as illustrated in FIG. 3. The read out voltage swing was significantly larger than the voltage swing 0.1 volt of a commercial magnetic drum, as illustrated in FIG. 2. The obtained Co-Cr film on the 6061 aluminum alloy has an excellent performance of magnetic drum.

Example 3

The steps of example 1 were repeated except that after being chemically polished and pretreated in phosphoric acid the aluminum alloy was electrodeposited with a current density of 73.71 mA/cm$^2$ in a cobalt-chromium plating bath. The chromium content of the resulting cobalt-chromium film was 8.29 wt %. The hardness, vertical coercive force (Hc $\perp$) and horizontal coercive force (Hc $\parallel$), vertical ramenence magnetization (Mr$\perp$) were horizontal ramenence magnetization (Mr$\parallel$) were also listed in Table 1, respectively.

Figure 4:
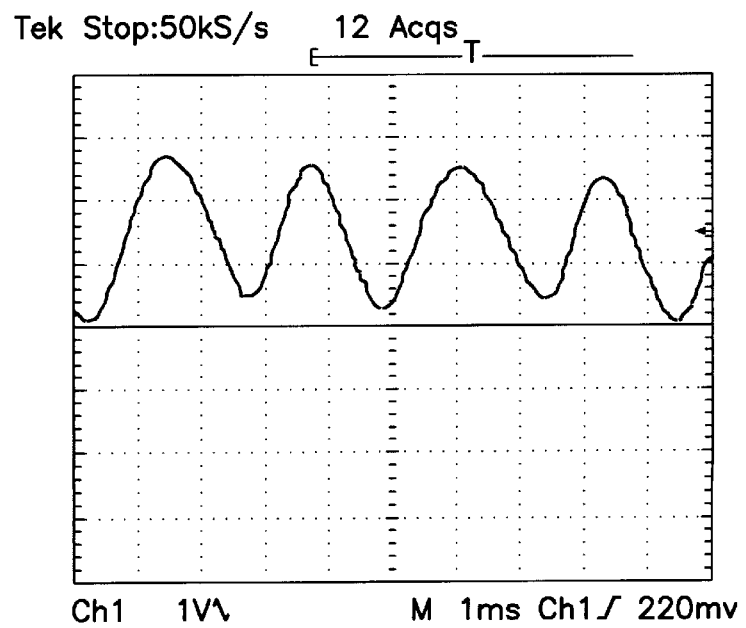
FIG. 4 shows the read out voltage of the cobalt-chromium film deposited on the 6061 aluminum alloy pretreated with a phosphate and electrodeposited at an electroplating current density of 73.71 mA/cm$^2$ according to the invention.

After the resulting Co-Cr film being magnetized, the voltage swing induced by a magnetic resistance sensor was about 1 volt, as illustrated in FIG. 4. The read out voltage swing was significantly larger than the voltage swing 0.1 volt of a commercial magnetic drum, as illustrated in FIG. 2. The obtained Co-Cr film on the 6061 aluminum alloy has an excellent performance of magnetic drum.

Example 4

The steps of example 1 were repeated except that after being chemically polished and pretreated in phosphoric acid, the aluminum alloy was electrodeposited with a current density of 92.13 mA/cm$^2$ in a cobalt-chromium plating bath. The chromium content of the resulting cobalt-chromium film was 10.24 wt %. The hardness, vertical coercive force (Hc $\perp$) and horizontal coercive force (Hc $\parallel$), vertical ramenence magnetization (Mr$\perp$) and horizontal ramenence magnetization (Mr$\parallel$) were also listed in Table 1, respectively.

Figure 5:
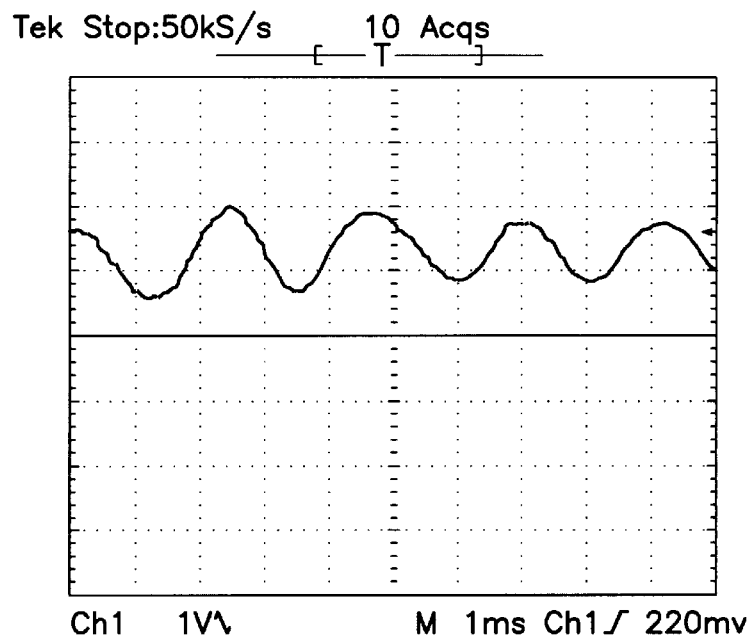
FIG. 5 shows the read out voltage of the cobalt-chromium film deposited on the 6061 aluminum alloy pretreated with a phosphate and electrodeposited at an electroplating current density of 92.13 mA/cm$^2$ according to the invention.

After the resulting Co-Cr film being magnetized, the voltage swing induced by a magnetic resistance sensor was about 0.5 volt, as illustrated in FIG. 5. The read out voltage swing was significantly larger than the voltage swing 0.1 volt of a commercial magnetic drum, as illustrated in FIG. 2. The obtained Co-Cr film on the 6061 aluminum allay has an excellent performance magnetic drum.

Table 1: The relationship of the current density of electrodepositing and the chromium content, hardness, vertical coercive force (Hc $\perp$), horizontal coercive force (Hc $\parallel$), vertical ramenence magnetization (Mr$\perp$) and horizontal ramenence magnetization (Mr$\parallel$) in the Co-Cr film after the chemical polishing and the phosphoric acid pretreatment

| Ex. no. | Current density (mA/cm²) | Chromium content wt % | Hardness (VHN) | Hc ⊥ (Oe) | Hc ∥ (Oe) | Mr ⊥ (emu) | Mr ∥ (emu) |
| --- | --- | --- | --- | --- | --- | --- | --- |
| Ex. 1 | 36.8 | 4.98 | 151 | 361.2 | 186.1 | 0.05 | 0.002 |
| Ex. 2 | 55.2 | 7.72 | 175 | 347.2 | 130.5 | 0.02 | 0.003 |
| Ex. 3 | 73.7 | 8.29 | 184 | 335.8 | 94.2 | 0.04 | 0.02 |
| Ex. 4 | 92.1 | 10.24 | 205 | 330.5 | 72.2 | 0.03 | 0.01 |

Example 5

The 6061 aluminum alloy was chemically polished and pretreated with zincate-dipping in about 13M NaOH solution and about 1M ZnO solution at a temperature of about 25° C. for 1 minute. The pretreated 6061 aluminum alloy was then placed into a plating bath containing cobalt and chromium ions and electrodeposited with a current density of 36.8 mA/cm². The composition of the plating bath contained about 0.07 M $CoCl_2 \cdot 6H_2O$, about 0.5M $CrCl_3 \cdot 6H_2O$, about 0.6M $NH_4Cl$, about 0.4M NaCl, about 0.2M $H_3BO_3$, about 1.64M N,N-dimethyl formamide and about 120 grams deionized water. The chromium content of the cobalt-chromium film resulting from the direct current electrodepositing at room temperature was 1.25 wt %. The hardness, vertical coercive force (Hc ⊥) and horizontal coercive force (Hc ∥), vertical ramenence magnetization (Mr⊥) and horizontal ramenence magnetization (Mr∥) were listed in Table 2, respectively.

Figure 6:
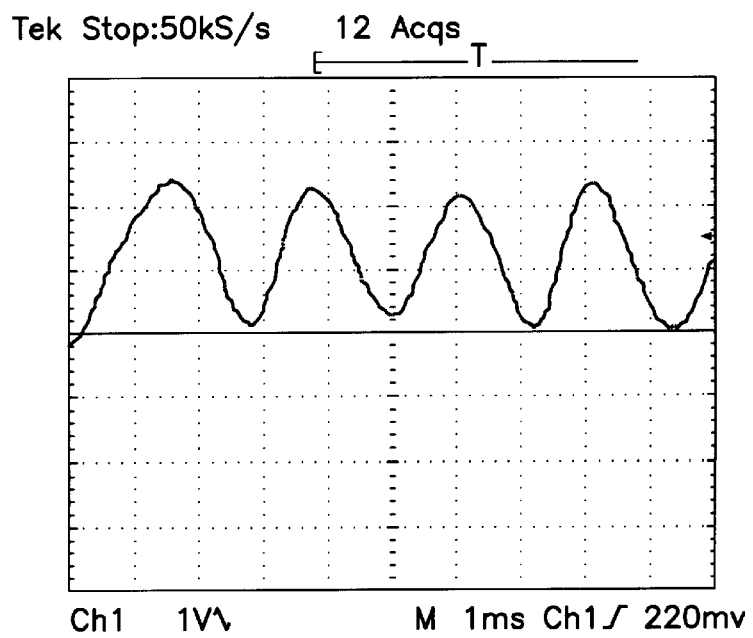
FIG. 6 shows the read out voltage of the cobalt-chromium film deposited on the 6061 aluminum alloy resulting from being pretreated with a zincate and electrodeposited in a plating bath of cobalt-chromium according to the invention.

After the resulting Co-Cr film being magnetized, the voltage swing induced by a magnetic resistance sensor was about 1 volt, as illustrated in FIG. 6. The read out voltage swing was significantly larger than the voltage swing 0.1 volt of a commercial magnetic drum, as illustrated in FIG. 2. Thus, the produced Co-Cr film on the 6061 aluminum alloy has an excellent performance of magnetic drum.

Example 6

The steps of example 5 were repeated except that after being chemically polished and pretreated by zincate-dipping, the aluminum alloy was electrodeposited with a current density of 55.2 mA/cm² in a cobalt-chromium plating bath. The chromium content of the resulting cobalt-chromium film was 1.12 wt %. The hardness, vertical coercive force (Hc ⊥) and horizontal coercive force (Hc ∥), vertical ramenence magnetization (Mr⊥) and horizontal ramenence magnetization (Mr∥) were also listed in Table 2, respectively.

After the resulting Co-Cr film being magnetized, the voltage swing induced by a magnetic resistance sensor was also about 1 volt, as illustrated in FIG. 6. The read out voltage swing was significantly larger than the voltage swing 0.1 volt of a commercial magnetic drum, as illustrated in FIG. 2. The produced Co-Cr film on the 6061 aluminum allay has an excellent performance of magnetic drum.

Example 7

The steps of example 5 were repeated except that after being chemically polished and pretreated by zincate-dipping, the aluminum alloy was electrodeposited with a current density of 73.71 mA/cm² in a cobalt-chromium plating bath. The chromium content of the resulting cobalt-chromium film was 1.42 wt %. The hardness, vertical coercive force (Hc ⊥) and horizontal coercive force (Hc ∥), vertical ramenence magnetization (Mr⊥) and horizontal ramenence magnetization (Mr∥) were also listed in Table 2, respectively.

After the resulting Co-Cr film being magnetized, the voltage swing induced by a magnetic resistance sensor was also about 1 volt, as illustrated in FIG. 6. The read out voltage swing was significantly larger than the voltage swing 0.1 volt of a commercial magnetic drum, as illustrated in FIG. 2. The produced Co-Cr film on the 6061 aluminum allay has an excellent performance of magnetic drum.

Example 8

The steps of example 5 were repeated except that after being chemically polished and pretreated by zincate-dipping, the aluminum alloy was electrodeposited with a current density of 92.13 mA/cm² in a cobalt-chromium plating bath. The chromium content of the resulting cobalt-chromium plated film was 0.97 wt %. The hardness, vertical coercive force (Hc ⊥) and horizontal coercive force (Hc ∥), vertical ramenence magnetization (Mr⊥) and horizontal ramenence magnetization (Mr∥) were also listed in Table 2, respectively.

After the resulting Co-Cr film being magnetized, the voltage swing induced by a magnetic resistance sensor was also about 1 volt, as illustrated in FIG. 6. The read out voltage swing was significantly larger than the voltage swing 0.1 volt of a commercial magnetic drum, as illustrated in FIG. 2. The produced Co-Cr film on the 6061 aluminum allay has an excellent performance of magnetic drum.

Table 2: The relationship of the current density of electrodepositing and the chromium content, hardness, vertical coercive force (Hc ⊥), horizontal coercive force (Hc ∥), vertical ramenence magnetization (Mr⊥) and horizontal ramenence magnetization (Mr∥) in the Co-Cr film after the zincate-dipping pretreatment

| Ex. no. | Current density (mA/cm²) | Chromium content wt % | Hardness (VHN) | Hc ⊥ (Oe) | Hc ∥ (Oe) | Mr ⊥ (emu) | Mr ∥ (emu) |
| --- | --- | --- | --- | --- | --- | --- | --- |
| Ex. 5 | 36.8 | 1.25 | 124 | 324.3 | 286.8 | 0.007 | 0.005 |
| Ex. 6 | 55.2 | 1.12 | 131 | 316.5 | 281.2 | 0.006 | 0.004 |
| Ex. 7 | 73.7 | 1.42 | 134 | 311.4 | 283.3 | 0.006 | 0.003 |
| Ex. 8 | 92.1 | 0.97 | 129 | 321.3 | 273.5 | 0.007 | 0.004 |

It is clear from the above examples that a Co-Cr film electrodeposited on aluminum alloy can be adjusted with the contents of cobalt and chromium and possesses excellent magnetic properties. More importantly, the manufacture of the Co-Cr thin film on the aluminum alloy (including the most difficulty electrodeposited 6061 aluminum alloy) by the special procedures of chemical polishing, pretreating either with a phosphate or with a zincate, and electroplating of the invention does not need the technology of vacuum sputtering in very expensive equipment. After being magnetized, the Co-Cr thin film on aluminum alloys obtained in the present invention possesses a stronger coercive force in the vertical direction (i.e. Hc⊥≦Hc ∥), and higher the vertical ramenence magnetization (Mr⊥) than the horizontal ramenence magnetization (Mr∥) and is suited for high density magnetization. The voltage swing induced by a magnetic resistance sensor is greater than that of generally commercial magnetic drums, and the signals are strong and clear. Furthermore, the designing of magnetic resistance element is more flexible through the control of the ratios of cobalt-chromium in the magnetic film. The mechanical properties such as hardness and adherence of the Co-Cr film all are good. Accordingly, the invention provides the Co-Cr thin film on aluminum alloys and an excellent process of manufacturing the same and has prominent contributions to the desired magnetic drum materials.

While the invention has been described with respect to certain preferred exemplifications and embodiments, it is not intended to limit the scope of the invention thereby, but solely by the claims appended hereto.

We claim:

1. An aluminum alloy cobalt-chromium magnetic recording film, comprising an aluminum alloy as a substrate, and a cobalt-chromium magnetic recording film electrodeposited on the substrate, the magnetic recording film having a chromium content of between 4–12 wt %, the chromium content being achieved by chemical polishing and phosphate pretreatment of the aluminum alloy, followed by electrodepositing in a plating bath containing cobalt and chromium, wherein magnetic characteristics of the cobalt-chromium magnetic recording film is flexibly adjusted according to cobalt-chromium ratios of the magnetic film.

2. An aluminum alloy cobalt-chromium magnetic recording film, comprising an aluminum alloy as a substrate, and a cobalt-chromium magnetic recording film electrodeposited on the substrate, the magnetic recording film having a chromium content of between 0.8–1.6 wt %, the chromium content being achieved by chemical polishing and zincate-diping pretreatment of the aluminum alloy, followed by electrodepositing in a plating bath containing cobalt and chromium, wherein magnetic characteristics of the cobalt-chromium magnetic recording film is flexibly adjusted according to cobalt-chromium ratios of the magnetic film.

3. A process of making an aluminum alloy electrodeposited a cobalt-chromium magnetic recording film of claim 1, comprising:

(a) chemically polishing an aluminum alloy and then pretreating the aluminum alloy with a phosphate; and (b) electrodepositing the aluminum alloy in a plating bath containing cobalt and chromium ions by direct current to prepare a cobalt-chromium magnetic recording film on the aluminum alloy, wherein the cobalt-chromium magnetic recording film has a chromium content of between 4–12 wt %.

4. The process of claim 3, further comprising grinding the aluminum alloy before chemically polishing and pretreating of step (a).

5. The process of claim 3, wherein the aluminum alloy is chemically polished in a solution of 9.6M $H_3PO_4$, 2.46M $CH_3COOH$ and 0.78M $HNO_3$ at 100° C. for 1 minute.

6. The process of claim 3, wherein the pretreatment in phosphate of step (a) is conducted in a 2–5M $H_3PO_4$ solution by using a carbon plate as a cathode and an aluminum alloy as an anode at a temperature of 25–45° C. and applying an anodic voltage of 10–30 volts for 5–20 minutes.

7. The process of claim 6, wherein the pretreatment in phosphate of step (a) is conducted in a 4–4.5M $H_3PO_4$ solution at a temperature of 35–40° C. by applying an anodic voltage of 17–23 volts for 8–15 minutes.

8. The process of claim 6, wherein the pretreatment in phosphate of step (a) is conducted in a 4.3M $H_3PO_4$ solution at a temperature of 38° C. by applying an anodic voltage of 20 volts for 10 minutes.

9. The process of claim 3, wherein the electrodepositing by direct current is accomplished by controlling a current density at 36.8–92.13 $mA/cm^2$.

10. A process of making an aluminum alloy electrodeposited a cobalt-chromium magnetic recording film of claim 2, comprising:

(a) chemically polishing an aluminum alloy and then pretreating the aluminum alloy with a zincate; and (b) electrodepositing the aluminum alloy in a plating bath containing cobalt and chromium ions by direct current to prepare a cobalt-chromium magnetic recording film on the aluminum alloy, wherein the cobalt-chromium magnetic recording film has a chromium content of between 0.8–1.6 wt %.

11. The process of claim 10, further comprising grinding the aluminum alloy before chemically polishing and pretreating of step (a).

12. The process of claim 10, wherein the aluminum alloy is chemically polished in a solution of 9.6M $H_3PO_4$, 2.46M $CH_3COOH$ and 0.78M $HNO_3$ at 100° C. for 1 minute.

13. The process of claim 10, wherein the pretreatment in zincate of step (a) is conducted by dipping the aluminum alloy in a 10–15M NaOH solution and 0.5–3M ZnO solution at a temperature of 20–30° C. for 0.5–1.5 minutes.

14. The process of claim 13, wherein the pretreatment of step (a) is conducted by dipping the aluminum alloy in a 12–14M NaOH solution and 0.5–1.5M ZnO solution at a temperature of 22–28° C. for 0.8–1.2 minutes.

15. The process of claim 13, wherein the pretreatment of step (a) is conducted by dipping the aluminum alloy in a 13M NaOH solution and 1M ZnO solution at a temperature of 25° C. for 1 minute.

16. The process of claim 10, wherein the electrodepositing by direct current is accomplished by controlling a current density at 36.8–92.13 $mA/cm^2$.

* * * * *